United States Patent [19]
Murphy

[11] Patent Number: 5,740,835
[45] Date of Patent: Apr. 21, 1998

[54] VALVE CONNECTOR

[75] Inventor: Kevin Murphy, Schaumburg, Ill.

[73] Assignee: Tuthill Corporation, Hinsdale, Ill.

[21] Appl. No.: 840,579

[22] Filed: Apr. 21, 1997

[51] Int. Cl.$^6$ .................................................. F16L 29/00
[52] U.S. Cl. ........................ 137/614.05; 137/614.03; 251/149.6
[58] Field of Search ...................... 251/149.6, 149.8; 137/614.03, 614.05

[56] References Cited

U.S. PATENT DOCUMENTS

| | | |
|---|---|---|
| 3,926,205 | 12/1975 | Gourlet . |
| 4,165,760 | 8/1979 | Guenther . |
| 4,193,419 | 3/1980 | Pellerito ............ 137/614.03 X |
| 4,338,793 | 7/1982 | O'Hern, Jr. ......... 137/614.05 X |
| 4,458,719 | 7/1984 | Strybel ............... 137/614.03 |
| 4,664,153 | 5/1987 | Bishop . |
| 4,759,572 | 7/1988 | Richardson . |
| 4,970,904 | 11/1990 | Knotts . |
| 4,995,417 | 2/1991 | Naku . |
| 5,007,448 | 4/1991 | Olinger . |
| 5,056,560 | 10/1991 | DeMartelaere ......... 137/614.04 |
| 5,080,132 | 1/1992 | Manz et al. .......... 251/149.6 X |
| 5,181,543 | 1/1993 | Hendzel . |
| 5,509,438 | 4/1996 | Leonard et al. . |

*Primary Examiner*—Kevin Lee
*Attorney, Agent, or Firm*—Lee, Mann, Smith, McWilliams, Sweeney & Ohlson

[57] ABSTRACT

A connector adapted for a quick connection to and for sealing and filling a valve assembly, such as a Schraeder Valve. The connector provides a secondary containment feature which prevents leakage when removing the connector, thereby improving performance and efficiency. The connector includes a collet member at one end that fits over the threaded portion of the valve assembly and, when closed, compresses a seal that engages the external threads of the valve, thereby eliminating the need for threading an external fitting on the valve assembly. As the system pressure increases, an internal plunger, having a forward flow orifice and a rear inlet orifice, is axially displaced and depresses the valve assembly stem. Simultaneously, the forward orifice passes ahead of an internal O-ring and allows fluid flow. As pressure is relieved from the system, the plunger and forward flow orifice move behind the internal O-ring and seal the piston chamber, thereby preventing leakage when removing the connector.

12 Claims, 4 Drawing Sheets

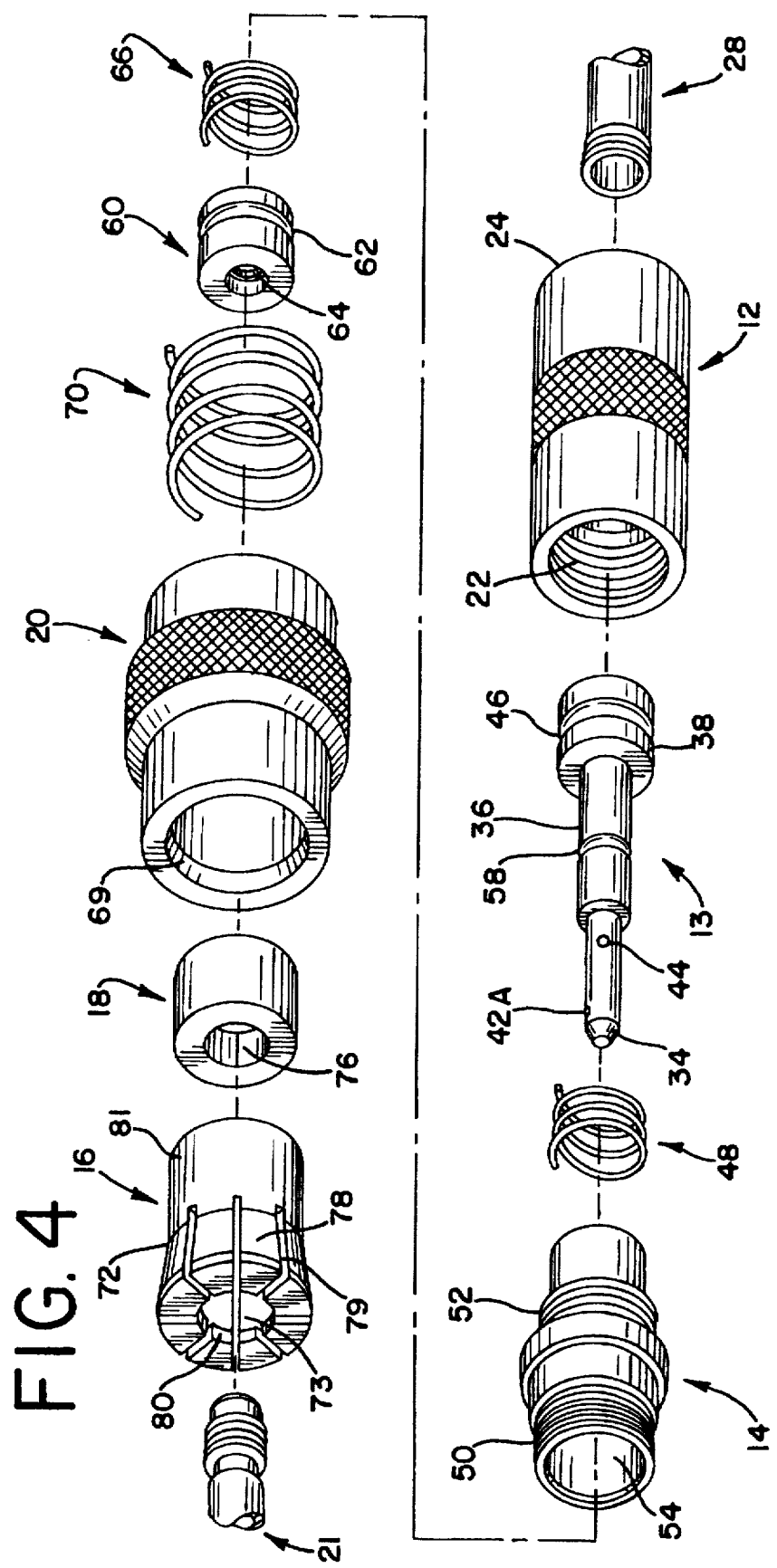

1

VALVE CONNECTOR

BACKGROUND OF THE INVENTION

This invention relates to connectors adapted to be coupled to a valve assembly such as a Schraeder Valve, while being in communication with a source of fluid trader pressure, for pressurization of the valve. Problems have been encountered with fluid leakage during the installation/removal of prior art connectors. Previous devices are attached/detached at the same time that the valve is being opened/closed. It is this simultaneous action that leads to some leakage when installing/removing the device. This allows pressurized fluid, some of which may be harmful to the environment, to escape.

SUMMARY OF THE INVENTION

A connector adapted for quick connection to and for sealing and filling a valve assembly with a valve stem, such as a Schraeder Valve. The connector provides a secondary containment feature which prevents leakage when installing or removing the connector. The connector consists of a collet member at one end that fits over the threaded portion of the valve assembly and, when closed, compresses an internal polyurethane seal that clamps on the external threads of the valve assembly, thereby eliminating the need for threading an external fitting on the valve assembly. The connector includes an internal plunger with a fluid passage, having a forward and rear orifice, which is axially displaced when the connector is pressurized and depresses the valve stem. The connector also includes an internal piston, which functions as an excess fluid retention barrier and is also operative to increase the effectiveness of the seal between the internal polyurethane seal and the Schraeder valve assembly as the pressure in the system increases. As pressure is relieved from the system, the piston remains in place, but the plunger and forward flow orifice move behind an internal O-ring and seal the piston chamber, thereby preventing leakage when removing the connector. The secondary containment feature is operative such that the valve assembly is not released from its sealed engagement in the connector until the desired pressurization of the valve assembly is completed and the plunger has returned to a position in which the pressurized fluid is sealed against escape.

BRIEF DESCRIPTION OF THE DRAWINGS

FIG. 4 is an exploded view of the connector with the collet sleeve disengaged from a Schraeder Valve.

DETAILED DESCRIPTION OF THE PREFERRED EMBODIMENT

Figure 1:
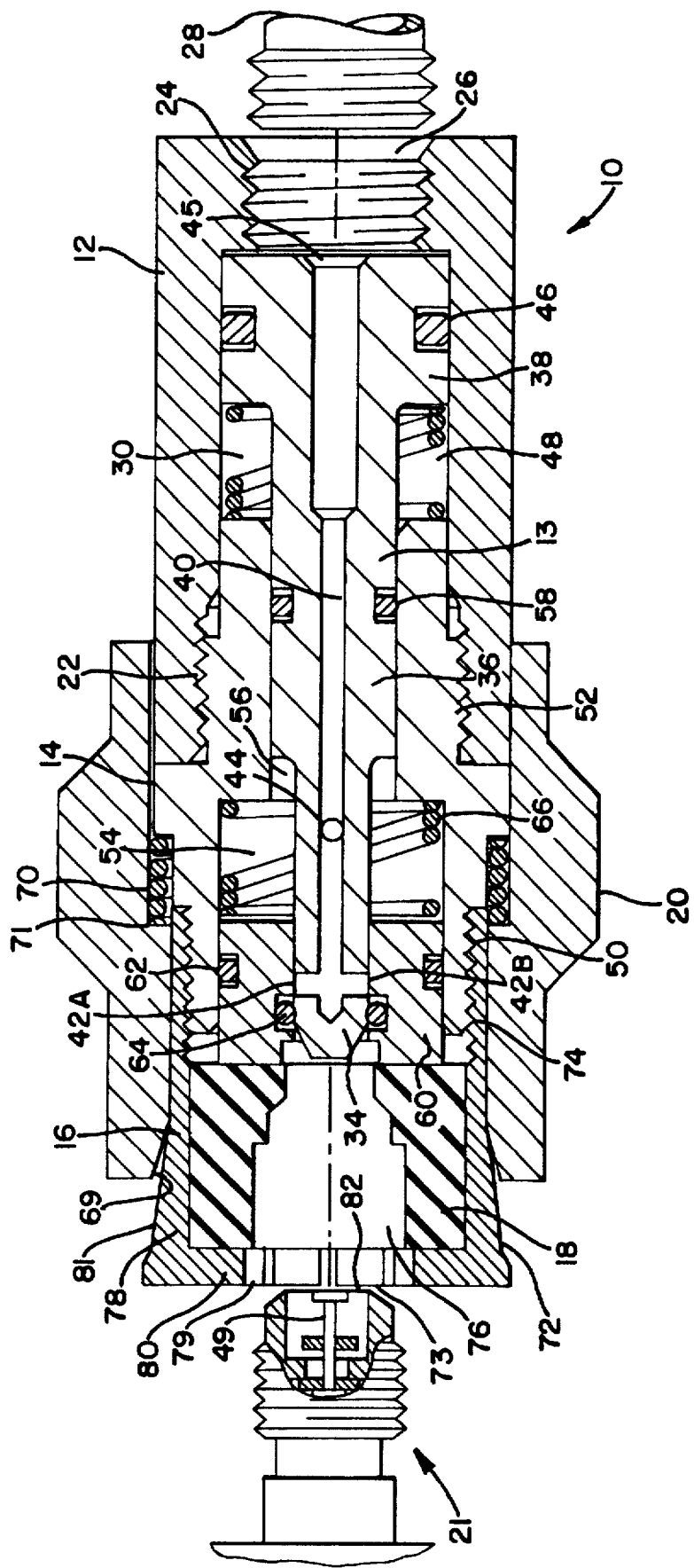
FIG. 1 is a cross-sectional view of the connector with the collet sleeve disengaged from a Schraeder Valve, which is shown in partial cross-section.

The present invention is directed to a connector which is adapted to quickly and effectively connect a valve assembly to a source of pressurized fluid for pressurization, and which also prevents leakage of the pressurizing fluid to the environment during installation and removal. As shown in FIG. 1, the connector, generally designated with the numeral 10, includes a housing member 12, a plunger 13, an insert member 14, a collet member 16, a sealing member 18, and a collet sleeve 20. The connector 10 is designed to be connected to the valve assembly 21.

The housing member 12 has an internally threaded first end 22 and a second end 24 which defines an housing inlet orifice 26 adapted for connection to a supply line 28. The line 28 can be threadably received within the housing inlet orifice 26 or secured in any of a number of other ways known to one of ordinary skill in the art to produce a sealed connection. A chamber 30 is defined within the housing member 12. A hurled surface shown in FIG. 4 may be provided on the outside surface of the housing member 12 to assist in the manual threading and unthreading of the housing member 12 and facilitate the coupling and decoupling of the assembled connector 10 to and from the valve assembly 21.

Figure 2:
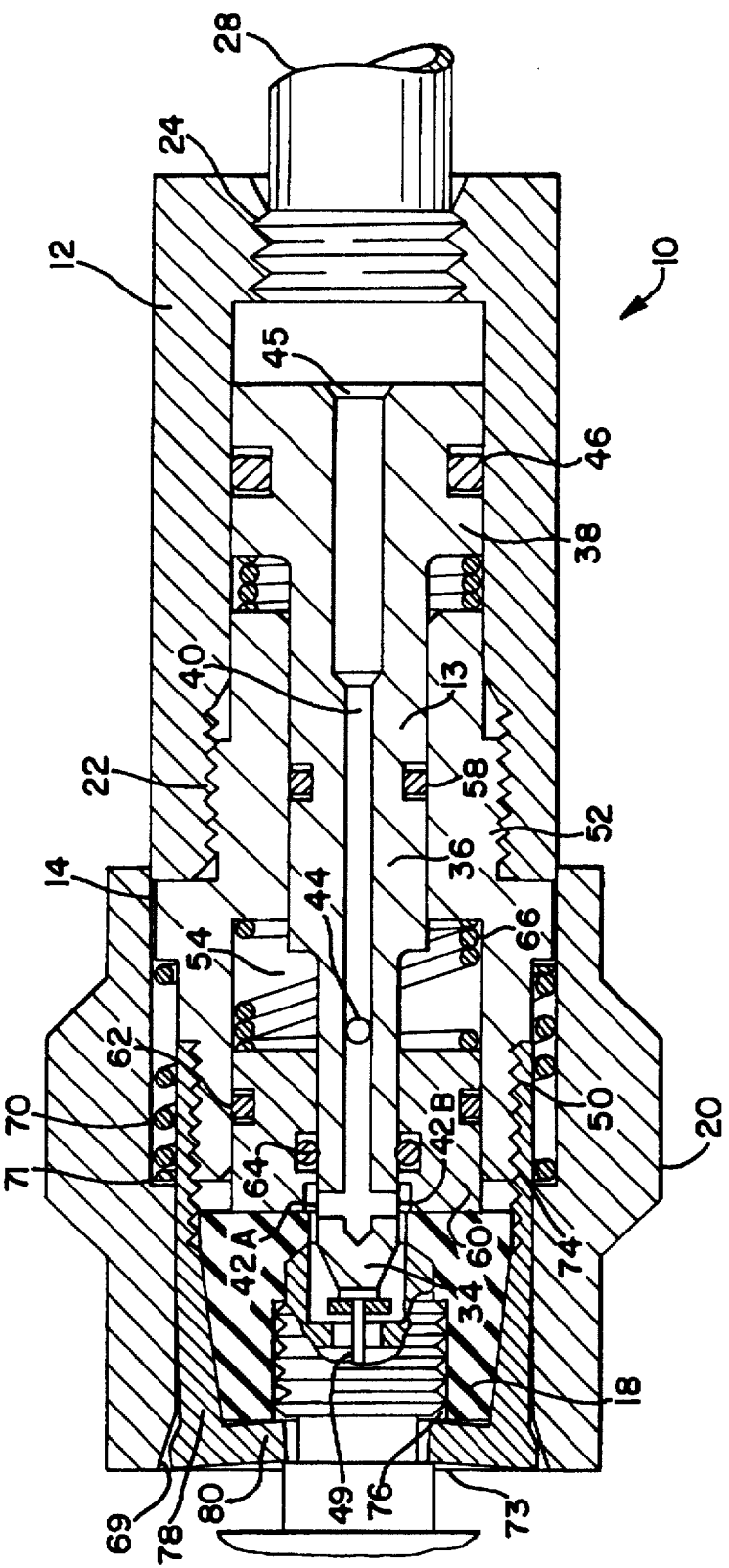
FIG. 2 is a cross-sectional view of the connector with the collet sleeve engaged over a Schraeder Valve, illustrating the plunger of the connector in a pressurizing position, engaging the valve stem.
Figure 3:
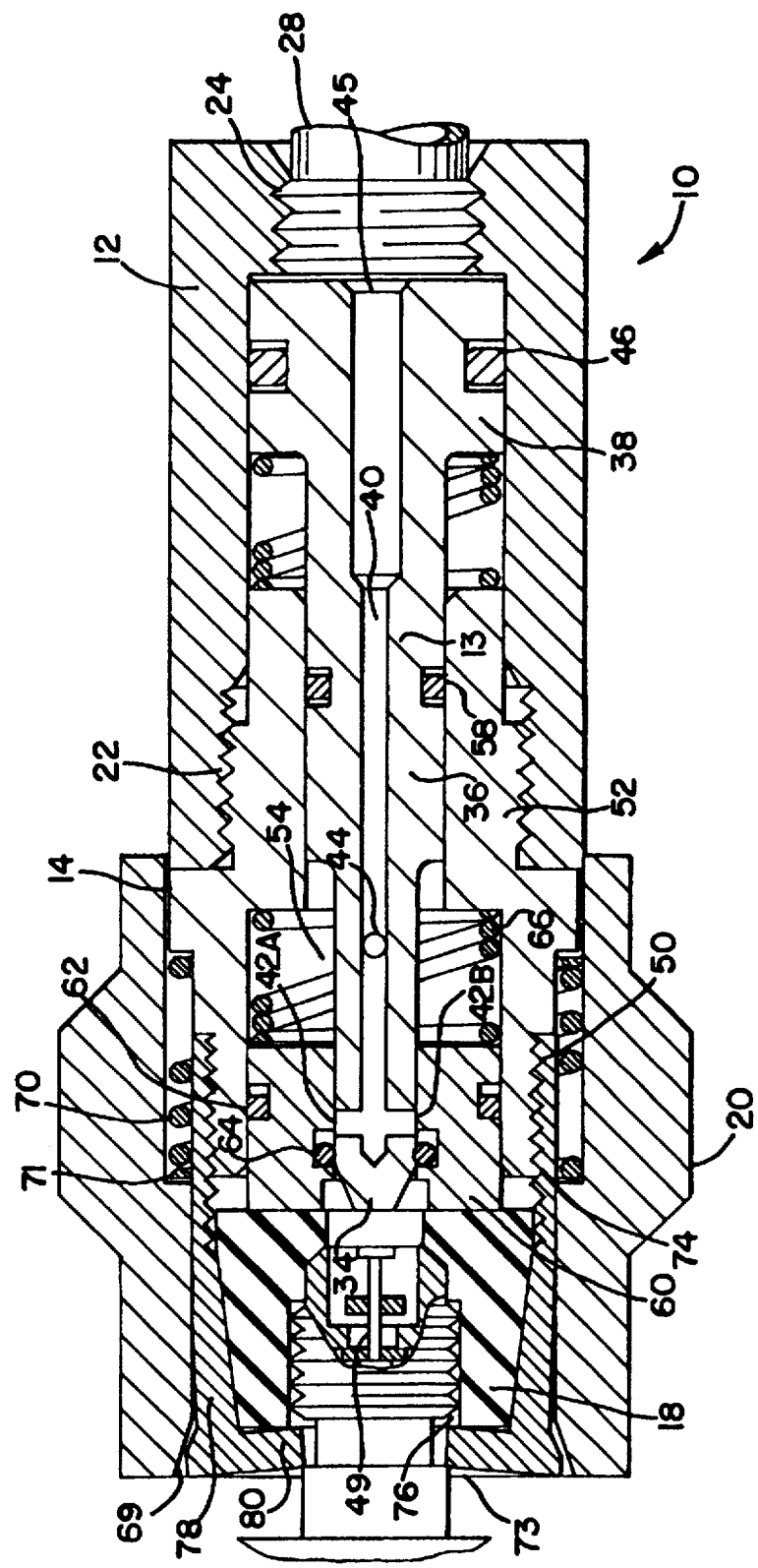
FIG. 3 is a cross-sectional view of the connector with the collet sleeve engaged, but with the plunger in a non-pressurizing position.

The plunger 13 is slidably disposed within the chamber 30 and adapted to move axially between the unpressurized position illustrated in FIGS. 1 and 3 and the pressurized position shown in FIG. 2. The plunger 13 includes a front portion 34, a middle portion 36 of greater diameter than the front portion and a rear portion 38, illustrated in the form of a land, which has a diameter slightly smaller than the diameter of the chamber 30 to allow axial movement. A fluid passage 40, in fluid communication with the housing inlet orifice 26, is defined internal to plunger 13, extending substantially throughout its length. The fluid passage 40 includes a pair of forward outlet orifices 42 A and B located in the front portion 34 of the plunger 13, a middle venting orifice 44, and an rear inlet orifice 45. A sealing member such as a Quad-ring 46 is disposed in a groove located on the rear portion 38 of the plunger 13 to seal the chamber 30 against the passage of pressurized fluid between the exterior of the plunger 13 and the inner wall of chamber 30. A resilient biasing member shown in the form of a plunger spring 48 is disposed within the chamber 30 and is adapted to engage the plunger 13 so as to normally urge the plunger 13 to the position illustrated in FIGS. 1 and 3, out of engagement with the valve stem 49.

The insert member 14 has an externally threaded first end 50 and an externally threaded second end 52, and is counterbored to produce a chamber 54 of greater cross-sectional diameter and a chamber 56 of lesser cross-sectional diameter. The middle portion 36 of the plunger 13 is positioned in chamber 56 while front portion 34 is located primarily in chamber 54. The cross-sectional diameter of middle portion 36 is slightly less than the cross-sectional diameter of chamber 56. A sealing member 58 illustrated as a Quad-ring is disposed in a groove formed in the middle portion 36 of the plunger 13 and prevents fluid flow by-pass from the chamber 54 back into the chamber 30. The externally threaded second end 52 of insert member 14 is secured to the internally threaded first end 22 of the housing member 12, thereby securing the housing member 12 to one end of the insert member 14 and compressing plunger spring 48 between one end of the insert member 14 and the rear portion 38 of plunger 13. The compressed spring 48 exerts a force against plunger 13 urging it toward the position illustrated in FIGS. 1 and 3.

A piston 60 is slidably disposed within the chamber 54. The piston 60 has an outer diameter slightly less than that of the chamber 54 and an inner diameter slightly greater than that of the front portion 34 of the plunger 13. A sealing member 62 also illustrated as a Quad-ring is disposed within a groove formed on the exterior surface of the piston 60.

sealing the surface between the piston 60 and the chamber 54. A sealing member 64 illustrated as an O-ring is internally disposed in a groove formed in the piston 60 and its function will hereinafter become apparent. A piston spring 66 is disposed within the chamber 54 and compressed between the insert member 14 and the piston 60, and is adapted to urge the piston 60 to the left as shown in FIG. 1 to engage the face of the sealing member 18 in sealing relation thereto.

The collet sleeve 20 is hollow and is slidably movable axially over portions of the collet member 16, the insert member 14 and the housing member 12. A knurled surface as shown in FIG. 4 may be provided on the outside diameter of the sleeve 20 to more easily allow for gripping and manual movement of the sleeve. The sleeve 20 has an internal dimension which is stepped in configuration. The left end of the sleeve 20, as viewed in FIG. 1, has an inner surface 69 which is inclined to form a ramp which extends from the left end for one quarter of an inch or so. A coil spring 70 is disposed internal to the collet sleeve 20 and compressed between a wall 71 formed internal to the sleeve 20 and a portion of the insert member 14 so as to urge the sleeve 20 to the left, as shown in FIG. 1, to assist in the maintenance of its forward position.

The collet member 16 is expandable and compressible and has a first end 72 which defines an opening 73 adapted to receive the valve assembly 21 and an internally threaded second end 74. An entrance chamber 76 is defined internal to the collet member 16. The internally threaded second end 74 is secured to the externally threaded first end 50 of the insert member 14, thereby securing the collet member 16 to the other end of the insert member 14. The first end 72 is formed of a plurality of closely spaced resilient fingers 78, each separated from the adjacent finger by a slit 79, each finger having a radially inwardly projecting tooth 80 at the outer end thereof, for gripping behind the threaded edges of the valve assembly 21. The collet member 16 has an outer surface 81 which is inclined at one end, as best shown in FIG. 1, and adapted to engage the inner surface 69 of the collet sleeve 20 so as to create a camming effect. Located within the chamber 76 is the sealing member 18, preferably a polyurethane seal, with an inner configuration adapted to encircle the outer threaded portion of the valve assembly 21.

The valve assembly 21 is typical of a wide variety of valve assemblies commonly referred to as "Schraeder Valves". Valve assemblies of this type are used in automobile and bicycle tires to allow the tire to be pressurized. The valve assembly 21 typically includes a valve stem 49, which is shown in FIGS. 1 and 3 biased to the closed position, in which no fluid flows into or out of the valve assembly 21. The valve assembly itself forms no part of the present invention but is illustrated for background and to better illustrate and describe the operation of the connector 10 of the present invention.

In operation, in order to connect the connector 10 to the valve assembly 21 for pressurization, the collet sleeve 20 is retracted to the position shown in FIG. 1. As the sleeve 20 moves from the position of FIG. 2, where it is normally urged by the coil spring 70, to the position of FIG. 1, the spring 70 is compressed. The inclined surface 69 of the sleeve 20 moves off of the inclined surface 79, thereby allowing each of the resilient fingers 78 to expand, thereby increasing the diameter of the opening 73 for easy insertion of the valve assembly 21. Once the valve assembly 21 is inserted into the chamber 76 as shown in FIG. 2, the connector 10 is placed over the external threads of the valve assembly 21 and the sleeve 20 is moved from the position shown in FIG. 1 to the position of FIG. 2. As the collet sleeve 20 is manually slid forward, the inclined surface 69 of the sleeve 20 engages the inclined surface 81 of the collet member 16, compressing all of the resilient fingers 78 toward the central axis of the connector 10. The collet 16 is closed, as shown in FIGS. 2 and 3, compressing the sealing member 18. The teeth 80 of the fingers 78 close behind the external threads of the valve assembly 21 and prevent accidental expulsion of the valve assembly 21 from the connector 10. The seal member 18 is compressed over the threads to surround and securely grip the valve assembly 21. This feature eliminates the need for threading an external fitting on to the valve assembly 21, which often leads to cross-threading and leakage when disconnected. The sealing member 18 prevents leakage both around the threads and around the valve assembly face 82.

As fluid enters the housing inlet orifice 26 from the supply line 28, the fluid pressure within the connector 10 increases. The force caused by the pressure acting against the end face of the plunger 13 overcomes the biasing force of the plunger spring 48, causing the plunger 13 to move forward and depress the valve stem 49 as shown in FIG. 2. Before the connector 10 is pressurized, plunger orifices 42 A and B are positioned behind the sealing member 64 thereby preventing the flow of pressurized fluid. After pressurization, however, the plunger 13 moves forward, with the front potion 34 depressing the valve stem 49. In this pressurizing position the orifices 42 A and B are located in front of the sealing member 64, thereby permitting pressurized fluid to flow through the connector 10 and through the valve assembly 21. Pressurized fluid passes through passage 40 and middle venting orifice 44 into chamber 54. This pressure acts against the rear face of piston 60, which produces a force toward the left from the position illustrated in FIG. 2 to increase its engagement with sealing member 18. This force, in combination with the force exerted by the spring 66 performs two functions. The sealing engagement between piston 60 and sealing member 18 functions as an excess fluid retention barrier preventing the escape of fluid from the valve assembly 21. The force exerted by the piston 60 on the face of the seal 18 increases proportionally to the pressure in the system and connector 10 and increases the effectiveness of the seal between the sealing member 18 and the valve assembly 21.

Once the valve assembly 21 has been pressurized to the desired value, as may be determined by a pressure gauge (not shown), flow from the pressure source to the connector 10 is terminated. As the pressure in the supply line 28 is decreased, the biasing force of the plunger spring 48 returns the plunger 13 to its original position as shown in FIG. 3, out of engagement with the valve stem 49. The piston 60 remains in place under the force exerted by spring 66. The plunger orifices 42 A and B move behind the sealing member 64 and seal the chamber 54. Any excess fluid in the connector 10 is communicated to the chamber 54, through the middle venting orifice 44. During pressurization the orifice 44 is in constant communication with the chamber 54. This pressure chamber 54 produces a force against the rear face of the piston 60 which, with the force exerted by spring 66, urges the piston 60 into sealing engagement with the right end of the seal member 18. When pressure from the pressure source is terminated, any excess pressure in the system is relieved to chamber 54. The connector 10 is sealed in the position illustrated in FIG. 3.

When pressurization is completed and the plunger returns to the position of FIG. 3, the collet sleeve 20 can be gasped and pulled against the force of spring 70 until the collet sleeve 20 returns to the position of FIG. 1. The fingers 78 are again allowed to expand to permit easy removal of the valve assembly 21. With the plunger 13 in the non-pressurizing position illustrated in FIG. 1, the connector system 10 remains sealed, preventing the escape of pressurized fluid to the environment.

Various features of the invention have been particularly shown and described in connection with the illustrated embodiment of the invention, however, it must be understood that these particular arrangements merely illustrate, and that the invention is to be given its fullest interpretation within the terms of the appended claims.

I claim:

1. A connector adapted to engage a valve assembly for pressurization thereof and adapted to be connected to a pressure source, said connector including a housing member defining a housing inlet orifice adapted to communicate with a source of pressurized fluid; a first chamber defined within said housing member; a plunger slidably disposed in said first chamber, said plunger having a valve engaging end and another end; a fluid passage defined internal to said plunger, said fluid passage being in fluid communication with said housing inlet orifice; an insert member including a first end slidably disposed within said first chamber and overlying a portion of said plunger and a second end extending from said first chamber toward the valve assembly; a second chamber defined internal to said insert member; an entrance chamber including an opening at one end adapted to receive the valve assembly; seal means disposed within said entrance chamber adapted to surround the valve assembly; locking means adapted to decrease the volume of said entrance chamber so as to cause said seal means to grippingly engage and secure the valve assembly; first resilient biasing means adapted to engage said plunger so as to urge said plunger to a first position, out of engagement with the valve assembly; said connector operative, when the valve assembly is engaged within said entrance chamber and pressurized fluid is communicated to said housing inlet orifice, to overcome the force exerted by said first resilient biasing means and cause said plunger to move to a second position to engage the valve assembly for pressurization thereof.

2. A connector as in claim 1 in which said seal means comprises a polyurethane seal with an uncompressed inner diameter greater than the external diameter of the valve assembly, whereby said seal means effects a circumferential seal about the valve assembly when said locking means is engaged.

3. A connector as in claim 1 including an inlet orifice defined in said plunger in communication with said housing inlet orifice and said fluid passage.

4. A connector as in claim 3 including one or more outlet orifices defined in said valve engaging end of said plunger in communication with said fluid passage.

5. A connector as in claim 4 including a venting orifice formed in said plunger in communication with said fluid passage and said second chamber.

6. A connector as in claim 1 including a piston disposed in said second chamber, said piston defining an internal passage therethrough through which said valve engaging end of said plunger extends.

7. A connector as in claim 6 including seal means positioned in said internal passage of said piston, said seal means operative when said plunger is in said first position to seal against fluid flow between said housing inlet orifice and said entrance chamber, but when said plunger is in said second position to permit such fluid flow.

8. A connector as in claim 6 including a second resilient biasing means disposed in said second chamber between said insert member and said piston adapted to urge said piston to engage said seal means, effecting a frontal compression of said seal means and preventing the leakage of said pressurized fluid along the piston-seal interface.

9. A connector as in claim 1 including an expandable collet member within which is defined said entrance chamber, said collet member adapted to interact with said locking means to increase or decrease the volume of said entrance chamber.

10. A connector as in claim 9 in which said collet member includes a plurality of resilient spaced fingers.

11. A connector as in claim 9 in which said locking means includes a collet sleeve, slidable along said housing member, to engage said collet member and decrease the volume of said entrance chamber.

12. A connector as in claim 11 including third resilient biasing means associated with said collet sleeve, operative to urge said collet sleeve into engagement with said collet member in a collet locking position.

* * * * *

UNITED STATES PATENT AND TRADEMARK OFFICE
CERTIFICATE OF CORRECTION

PATENT NO. : 5,740,835
DATED      : April 21, 1998
INVENTOR(S): Kevin Murphy

It is certified that error appears in the above-indentified patent and that said Letters Patent is hereby corrected as shown below:

Column 1, line 7, the word "trader" should read -under-

Column 2, line 13, the word "hurled" should read -knurled-

Column 4, line 65, the word "gasped" should read -grasped-

Signed and Sealed this

Twenty-first Day of July, 1998

Attest:

BRUCE LEHMAN

Attesting Officer

Commissioner of Patents and Trademarks